United States Patent [19]

Wieserman et al.

[11] Patent Number: 5,037,795

[45] Date of Patent: * Aug. 6, 1991

[54] CHROMATOGRAPHIC PACKING MATERIAL COMPRISING EXTENDED AREA METAL OXIDE/HYDROXIDE PARTICLES WITH A LAYER OF A PHOSPHORUS-CONTAINING MATERIAL THEREON

[75] Inventors: Larry F. Wieserman; Karl Wefers, both of Apollo; Kathryn Cross, Murrsyville; Edward S. Martin, New Kensington, all of Pa.

[73] Assignee: Aluminum Company of America, Pittsburgh, Pa.

[*] Notice: The portion of the term of this patent subsequent to Nov. 29, 2005 has been disclaimed.

[21] Appl. No.: 265,244

[22] Filed: Oct. 31, 1988

Related U.S. Application Data

[63] Continuation-in-part of Ser. No. 23,423, Mar. 9, 1987, Pat. No. 4,788,176, which is a continuation-in-part of Ser. No. 946,870, Dec. 29, 1986, abandoned.

[51] Int. Cl.$^5$ .................. B01J 20/22; B01J 20/08; B01D 15/08; B32B 9/00
[52] U.S. Cl. .................. 502/401; 55/67; 210/198.2; 210/635; 210/656; 427/220; 502/402; 502/403; 502/404; 502/407; 502/415
[58] Field of Search .............. 502/401, 402, 407, 415, 502/162, 4; 427/244, 402, 220; 55/67, 186, 16, 158; 210/656–659, 198.2, 198.3, 500.21, 500.25, 500.26, 500.27

[56] References Cited

U.S. PATENT DOCUMENTS

| | | | |
|---|---|---|---|
| 3,013,904 | 12/1961 | Cupery | 117/76 |
| 4,202,798 | 5/1980 | Johnson et al. | 252/437 |
| 4,308,079 | 12/1981 | Venables et al. | 148/6.15 R |
| 4,382,016 | 5/1983 | Rickelton et al. | 252/428 |
| 4,506,628 | 3/1985 | Stockel | 119/1 |
| 4,786,628 | 11/1988 | Wieserman et al. | 502/401 |
| 4,788,176 | 11/1988 | Wieserman et al. | 502/401 |
| 4,816,159 | 3/1989 | Khosah et al. | 210/502.1 |
| 4,822,593 | 4/1989 | Wilhelmy | 210/656 |
| 4,871,711 | 10/1989 | Martin et al. | 502/415 |
| 4,900,537 | 2/1990 | Wilhelmy | 423/629 |

Primary Examiner—Paul E. Konopka
Attorney, Agent, or Firm—Andrew Alexander

[57] ABSTRACT

A chromatographic packing material is disclosed which comprises generally spherical metal oxide/hydroxide support particles comprising crystals extending radially outward from a central core region and having a shape selected from principally acicular to principally lamellar and having bonded to the surface of said metal oxide/hydroxide support particles a layer of one or more phosphorus-containing organic materials comprised of a phosphorus-containing acid group bonded to said metal oxide/hydroxide particles and an unreacted carbon-containing acid group.

15 Claims, 7 Drawing Sheets

From Aluminate Solutions

CHROMATOGRAPHIC PACKING MATERIAL COMPRISING EXTENDED AREA METAL OXIDE/HYDROXIDE PARTICLES WITH A LAYER OF A PHOSPHORUS-CONTAINING MATERIAL THEREON

CROSS REFERENCE TO RELATED APPLCIATIONS

This application is a continuation-in-part of U.S. Ser. No. 023,423, filed Mar. 9, 1987, now U.S. Pat. No. 4,788,176, which is a continuation-in-part of U.S. Ser. No. 946,870, filed Dec. 29, 1986 (now abandoned), and is related to U.S. Ser. No. 023,312, filed Mar. 9, 1987, now U.S. Pat. No. 4,871,711 and U.S. Ser. No. 023,429, filed Mar. 9, 1987, now U.S. Pat. No. 4,786,628.

BACKGROUND OF THE INVENTION

1. Field of the Invention

This invention relates to improved chromatography packing material. More particularly, this invention relates to such a packing material comprising a generally spherical metal oxide/hydroxide particle comprised of solid crystals of metal oxide/hydroxide, with the crystals extending radially outward from a central core region and having a shape selected from principally acicular to principally lamellar, and having the surface thereof reacted with a phosphorus-containing material to form a layer thereon thereby to provide an improved chromatographic packing material.

2. Description of the Related Art

Chromatographic packing materials made from organic resins suffer from poor physical strength, poor thermal stability, high cost, solvent swelling, and low capacity. Chromatographic packing materials made from metal oxides such as silica exhibit poor chemical stability at high pH. For many applications, in particular for reversed phase chromatography, a chromatographic packing material with high physical integrity, good chemical stability over high and low pH conditions, specific surface functionalities, good thermal stability, and low cost is needed.

Other metal oxides such as alumina have been used as adsorbents because of the good physical integrity and low cost of alumina. The solubility of alumina in pH ranges between 4 and 9 is very low and the material is, therefore, chemically and physically stable in this pH range. However, beyond this pH range, on either the basic or acidic side, alumina becomes soluble in aqueous media and its physical strength and integrity degrades rapidly.

Modifications of metal oxide/hydroxide materials have been proposed. Wieserman et al U.S. Pat. Application Ser. Nos. 946,870 and 023,423 disclose and claim metal oxide/hydroxide surfaces reacted with phosphonic acid or phosphinic acid to form a monomolecular layer thereon to stabilize the metal oxide/hydroxide by modifying the surface of the particle. Wieserman et al U.S. Pat. Application Ser. No. 023,429 (U.S. Pat. No. 4,786,628) discloses and claims a chromatographic packing material comprising a metal oxide/hydroxide particle reacted with phosphonic acid to form a monomolecular layer thereon which provides a chromatographic packing material having good pH stability as well as high efficiency.

Martin et al U.S. Pat. Application Ser. No. 023,312 discloses and claims the formation, on a metal oxide/hydroxide surface such as an aluminum oxide/hydroxide, of a monomolecular layer of a phosphorus-containing organic material having 1-2 phosphorus groups thereon. The phosphorus-containing groups described therein may comprise phosphoric acid monoesters or diesters.

Wilhelmy U.S. Pat. Application Ser. Nos. 940,354 and 022,735 disclose and claim the formation of an aluminum hydroxide particle of extended area which comprises a generally spherical aluminum hydroxide particle comprised of solid crystals of aluminum hydroxide with the crystals extending radially outward from a central core region and having a shape selected from principally acicular to principally lamellar.

Venables et al U.S. Pat. No. 4,308,079 teaches the treatment of an aluminum oxide surface of an aluminum substrate with a monomolecular layer of an amino phosphonate compound such as nitrilotris (methylene) triphosphonic acid to retard hydration of the aluminum oxide to aluminum hydroxide to provide a more stable microporous surface which is particularly suited to commercial adhesives. The presence of the hydrated oxide is said to interfere with the formation of a satisfactory bond between the adhesive and the oxide, while the phosphonate treatment is said to inhibit the conversion of the oxide to hydroxide without interfering with subsequent bonding of the adhesive to the oxide.

SUMMARY OF THE INVENTION

An improved chromatographic packing material is provided comprising a metal oxide/hydroxide particle having an extended surface area and a lower resistance to flow through the packing material and having on the surface thereof a layer formed by treating the surface of the support material with a phosphorus-containing material with the active or desirable remainder of the respective molecules forming the layer being oriented away from the surface of the metal oxide/hydroxide particle for interaction with organic materials being passed through the chromatography packing material.

It is, therefore, an object of this invention to provide an improved chromatographic packing material comprising a metal oxide/hydroxide particle of extended area with a layer of one or more phosphorus-containing materials on the surface of a metal oxide/hydroxide particle.

It is another object of this invention to provide an improved chromatographic packing material comprising a metal oxide/hydroxide particle of extended area with a layer of one or more phosphorus-containing materials bonded to the surface of a metal oxide/hydroxide particle to provide an improved chromatographic packing material having an extended surface area, lower resistance to flow through, stable at extended pH ranges, and capable of high efficiency in separation of materials.

It is still another object of this invention to provide an improved chromatographic packing material comprising a metal oxide/hydroxide particle of extended area comprised of solid crystals of metal oxide/hydroxide, with the crystals extending radially outward from a central core region and having a shape selected from principally acicular to principally lamellar, with a layer of one or more phosphorus-containing materials reacted with the surface of the metal oxide/hydroxide particle to provide an improved chromatographic packing material having an extended surface area, improved chemical stability, and lower resistance to flow through.

It is a further object of this invention to provide an improved chromatographic packing material comprising an aluminum hydroxide particle of extended area comprised of solid crystals of aluminum hydroxide, with the crystals extending radially outward from a central core region and having a shape selected from principally acicular to principally lamellar, with a monomolecular layer of one or more phosphorus-containing materials reacted with the surface of the aluminum hydroxide particle to provide an improved chromatographic packing material having an extended surface area, improved chemical stability, and lower resistance to flow through.

It is yet another object of this invention to provide a process for making such an improved chromatographic packing material.

These and other objects of this invention will be obvious from the following description and accompanying drawings.

DETAILED DESCRIPTION OF THE INVENTION

In accordance with the invention, the chromatographic packing material comprises a metal oxide/hydroxide particle of extended area comprised of solid crystals of the metal oxide/hydroxide, with the crystals extending radially outward from a central core region and having a shape selected from principally acicular to principally lamellar, with a layer on the surface thereof comprising one or more phosphorus-containing materials. While the material of the invention as will be hereinafter described finds particular utility as an improved chromatographic packing material, it will be appreciated that the material may be used for other purposes as well such as, for example, a filler for polymers, a catalyst, catalyst support, flocculant, membrane coating, or for immobilizing bioactive materials such as enzymes.

The use of the term "metal oxide/hydroxide" herein is intended to define a broad spectrum of oxides ranging from those which may contain few hydroxides, e.g., activated forms of aluminum oxide (alumina) to more hydrated forms which may comprise mainly hydroxide, e.g., $Al(OH)_3$. It has been found, however, that the metal with hydroxyl groups, rather than the metal oxide form without hydroxide groups, i.e., completely dehydroxylated forms, provides a better bond with the phosphorus-containing group on the molecule with which it is reacted. However, for certain applications, dehydrated or activated forms of the metal oxide/hydroxide may be preferred due to the higher surface area of such particles. For example, when an aluminum oxide/hydroxide is used, the hydrated form will be preferred, e.g., gibbsite, bayerite, or boehmite will be preferred when predominantly external surface and little or no internal surface area is desired, and activated alumina will be preferred when it is desirous that the metal oxide/hydroxide have a large internal surface area.

As presently understood, the metal oxide/hydroxides suitable for use in the present invention usually require hydroxyl groups on the surface thereof for purposes of providing bonding sites for the phosphorus-containing group or groups on the molecule to be chemically reacted or bonded to the metal oxide/hydroxide particle. For example, when the particulate material is alumina and the phosphorus-containing material is phosphonic acid, hydroxyl groups on the surface of the alumina are believed to react with the phosphorus-containing group of the phosphonic acid molecule, i.e., with the —POOH acid group of the phosphonic acid. When using an organic solvent, particularly where the solvent is immiscible with water, a monolayer of hydroxyl groups are provided on the alumina particles for purposes of reacting to form a chemical bond with the phosphonic acid groups. It will be appreciated that if more than a monolayer of hydroxyl units are present on the alumina surface, such as hydroxyl units present as a result of water, this additonal water layer can act to hinder the reaction. Thus, while it is preferred to have a maximum of a monolayer of hydroxyl units, less than a complete surface layer of hydroxyl units can be present on the metal oxide and such does not hinder reactivity.

While alumina, i.e, aluminum oxide/hydroxide, is a particularly preferred metal oxide/hydroxide support material for forming the chromatographic packing material of the invention, other metal oxide/hydroxides may also be used. Examples of such other metal oxide/hydroxides which may be used as the support particle for reaction with the phosphorus-containing material include any metal capable of forming an oxide/hydroxide selected form the class consisting of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In, and Tl), IVb (Ge, Sn, and Pb), Vb (As, Sb and Bi), elemetns in the lanthanide series and the actinide series, mixtures thereof, and mixtures of Groups IIa (Be, Mg, Ca and Ra) and VIb (Se, Te, and Po) and combinations thereof. For example, the oxide/hydroxides of magnesium, titanium, zirconium, iron, chromium, zinc, vanadium, and combinations of these may be used. Particularly preferred metal oxide/hydroxides are the oxide/hydroxides of Al, Ti, Zr, and Fe.

Also, a core or center of iron oxide/hydroxide or other paramagnetic or ferromagnetic material may be used with a coating of a metal compound to take advantage of the magnetic properties of the iron oxide/hydroxide as an adsorbent. It should be noted that by use of the term "metal", it is intended to include not only the traditional metals, but also materials sometimes referred to as metalloids such as Se, B, As, and Te and to exclude the remaining elements referred to as nonmetals in the periodic table.

While the invention is primarily directed to the use of metal oxide/hydroxide particles as support materials for reaction with the phosphorus-containing organic molecules to form the chromatographic packing material of the invention, it is within the purview of this invention that other metal compounds could be used in substitution for the metal oxide/hydroxides such as metal silicates, oxalates, phosphates, sulfates, carbonates, apatites, hydrotalcites, zeolites, kaolin, clays and chromates as well as combinations of such materials or combinations of any of such materials with the preferred metal oxide/hydroxide support materials. Also metal oxide/hydroxides such as aluminum oxide/hydroxides with surfaces ion-exchanged or adsorbed with titanium, iron, or zirconium ions or oxides may be used.

The extended area metal oxide/hydroxide support particles may be formed in accordance with the teachings of the aforesaid Wilhelmy U.S. Pat. Applications (Ser. Nos. 940,354 and 022,735), now U.S. Pat. Nos. 4,900,537 and 4,822,593 cross reference to which is hereby made, to form the metal oxide/hydroxide particles of extended area which comprises a generally spherical particle comprised of solid crystals of metal oxide/hydroxide with the crystals extending radially outward from a central core region and having a shape selected from principally acicular to principally lamellar.

The terms "particle morphology" and "habit" are synonymous with the shape or form of a crystal, e.g., lamellar, tabular, equant, columnar, or acicular, as opposed to the crystal structure or system, e.g., tetragonal, orthorhombic, monoclinic, etc. While the crystal structure determines the number and types of crystalline faces, the morphology or habit is determined by the relative growth rates of the crystalline faces, with the fastest growing faces "disappearing" leaving the slower growing faces to define the final shape.

Figure 1:
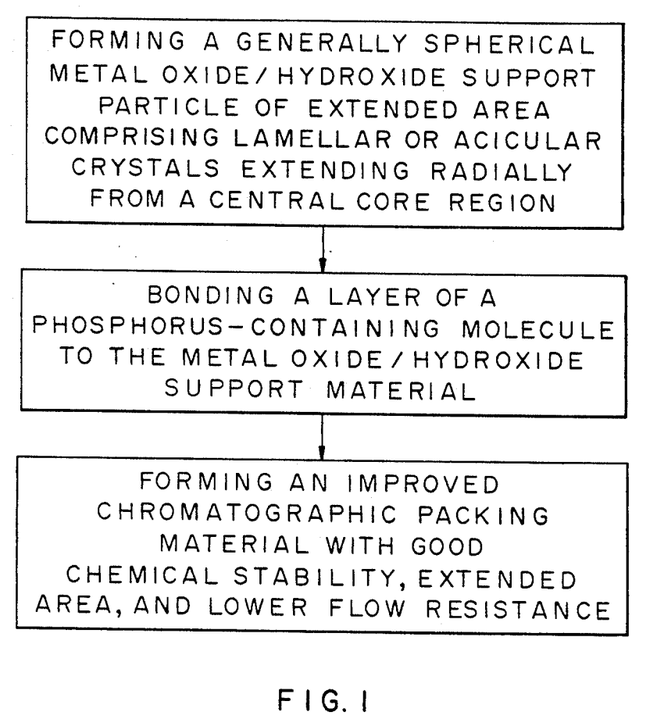
FIG. 1 is a flow sheet illustrating the process of the invention.
Figure 2:
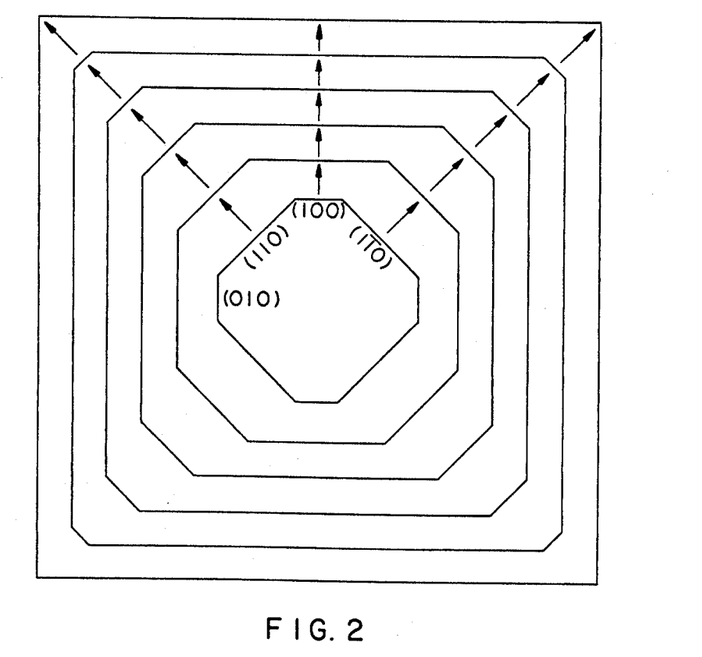
FIG. 2 is an illustration of a two dimension crystal showing the effect of slower growing planes on the eventual habit or morphology of the crystal.
Figure 3:
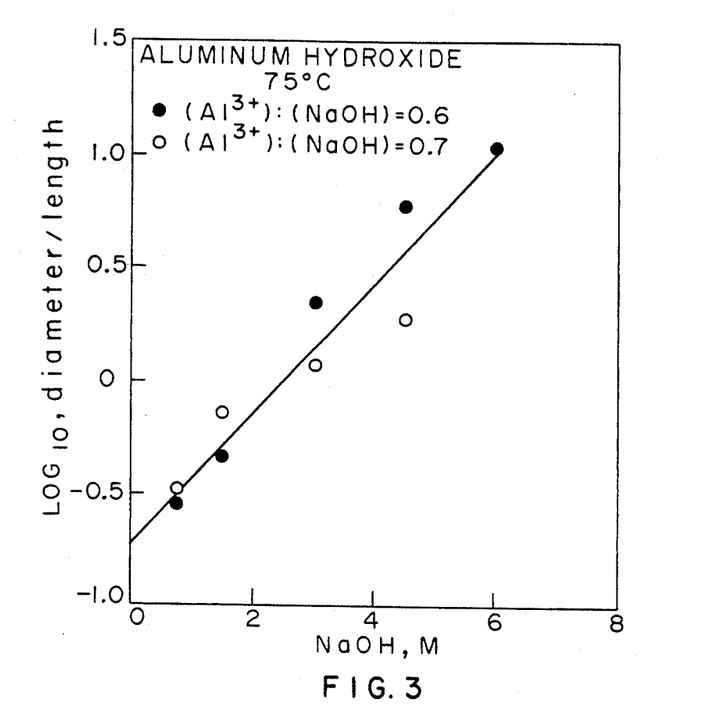
FIG. 3 is a graph showing the effect of sodium hydroxide concentration on the particle diameter to length ratio of sodium aluminate solutions aged at 75° C.
Figure 4:
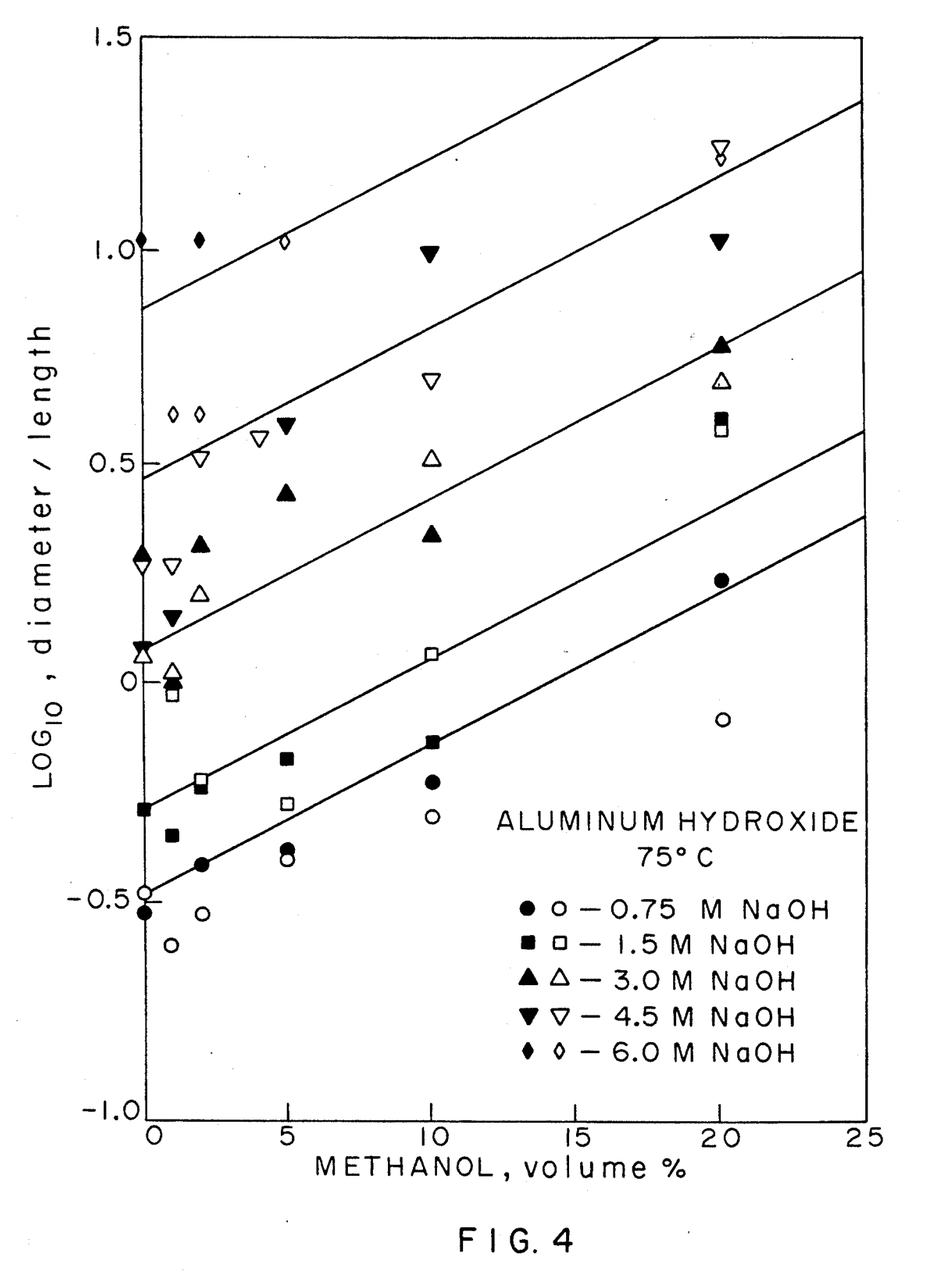
FIG. 4 is a graph of particle diameter to length ratio of sodium aluminate solutions aged at 75° C. at several sodium hydroxide concentrations as a function of methanol concentration.
Figure 5:
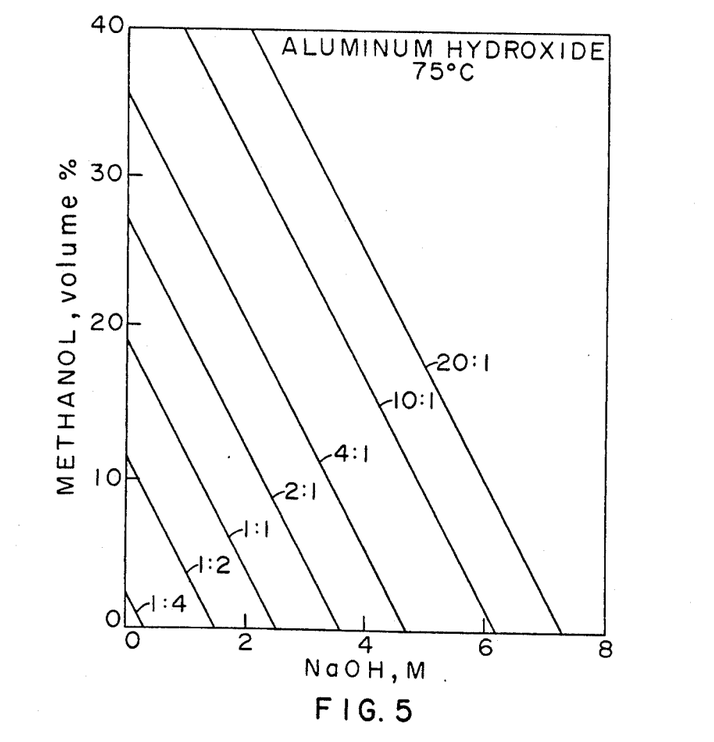
FIG. 5 is a plot showing the predicted isomorphs as a function of sodium hydroxide and methanol concentrations.
Figure 6A:
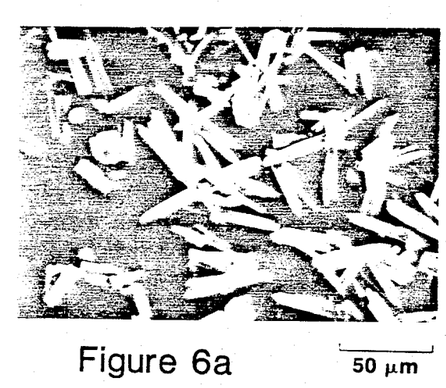
FIGS. 6a is a scanning electron micrograph showing acicular aluminum hydroxide crystals.
Figure 6B:
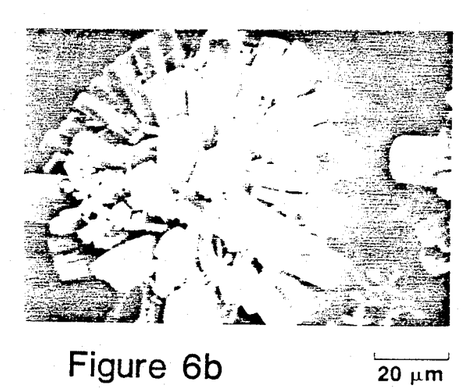
FIGS. 6b is a scanning electron micrograph showing a generally spherical aluminum hydroxide particle comprising the acicular aluminum hydroxide crystals of FIG. 6a bonded together at a central core region.
Figure 6C:
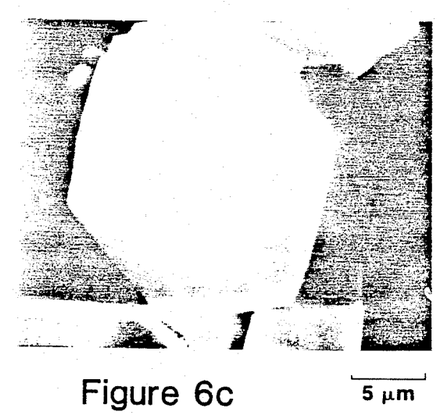
FIGS. 6c is a scanning electron micrograph showing lamellar aluminum hydroxide crystals.
Figure 6D:
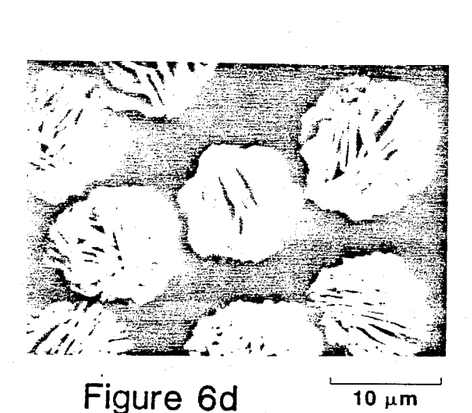
FIGS. 6d is a scanning electron micrograph showing generally spherical aluminum hydroxide particles comprising the lamellar aluminum hydroxide crystals of FIG. 6c bonded together at a central core region.

This effect is shown in FIG. 2 with a two dimensional crystal where the (110) and (110) planes grow faster than the (100) and (010) planes. As seen in the outer edges of the illustrated crystal, the slower growing (100) and (010) planes then eventually define the habit or morphology of the crystal.

The Wilhelmy patent applications describe a process to control the morphology or habit of aluminum hydroxide crystals to permit the respective production of crystals which are principally lamellar (flat platelets) or principally acicular (needle-like) as well as intermediate forms.

As described therein, the aluminum hydroxide crystals may be precipitated from a caustic solution of alkali metal aluminate dissolved in an alkali metal hydroxide or the solution may be a so-called "Bayer liquor" produced in the caustic digest of an alumina-bearing ore such as bauxite by a caustic solution containing an alkali metal hydroxide such as sodium hydroxide in what is known as the "Bayer Process".

While the above description is particularly applicable to the formation of aluminum oxide/hydroxide particles which are generally spherical and comprise solid crystals of aluminum oxide/hydroxide, with the crystals extending radially outward from a central core region and having a shape selected from principally acicular to principally lamellar, other metal oxide/hydroxide particles in similar physical form may also be used as the support surface in forming the chromatographic packing material of the invention.

By use of the term "crystals" is meant a material or form having a particular morphology or habit, including an amorphous form, but not necessarily an ordered atomic structure or x-ray diffraction pattern.

To produce the chromatographic packing material comprising the metal oxide/hydroxide reacted with one or more types of phosphorus-containing organic molecules, the metal oxide/hydroxide, such as alumina, should first be activated or calcined. This calcination step increases the porosity and therefore the surface area of the metal oxide/hydroxide which, in turn, permits the formation of a higher weight percent of coating material to be applied. The calcination also causes any sodium remaining in the material to migrate to the surface where it can be removed as will be described below. The calcination can be accomplished by heating the metal oxide/hydroxide to a temperature of from about 300° to 1100° C., preferably about 500°–950° C., depending upon the particular metal oxide/hydroxide used, typically about 650°–950° C. for alumina, and maintaining the metal oxide/hydroxide at that temperature for about 1 to 10 hours, preferably about 2–3 hours. This activation is usually carried out at ambient pressure, but the use of higher or lower pressures is also possible.

The calcined or activated metal oxide/hydroxide should then be neutralized if any alkali metals are present in the starting materials. This may be accomplished by slurrying the metal oxide/hydroxide material in deionized water and holding the material in suspension by vigorous stirring, e.g., mechanical stirring, while the pH of the slurry is measured. An acid such as nitric acid may be added to the slurry until the pH reaches about 6.5. The slurry is maintained at this pH for about 2 hours after which the metal oxide/hydroxide may be allowed to settle. The liquid is then removed, e.g., by decanting, and then the product is further washed with deionized water. This wash water is then also removed from the metal oxide/hydroxide and the product is dried to remove any remaining wash liquid.

The calcined and neutralized metal oxide/hydroxide may then be reacted with a phosphorus-containing material such as a phosphoric acid monoester, a phosphoric acid diester, a phosphonic acid, or a phosphinic acid in a suitable media including an aqueous or nonaqueous solution, emulsion, or suspension, at a temperature which may range from just above the freezing point of the solution up to about the boiling point, typically from about 10° C. up to about 90° C., preferably about 50° C., for a period of from at least 0.01 second to not more than 20 hours, and preferably from at least about 0.5 hours up to about 4 hours, using an initial acid concentration of at least about 0.0001 to 0.1 molar. In some instances higher concentrations may be desired. When the media is non-aqueous, the temperature range can be greatly extended. For example, it may range from 5° C. or lower to 200° C. or sometimes higher depending on the solvent. The reaction is normally carried out at atmospheric pressure. However, the use of an elevated pressure or a subatmospheric pressure should be deemed to be within the scope of the invention. A flowing bed reactor or an aerosol may also be utilized in the treatment of the metal oxide/hydroxide particles with the phosphorus- containing material.

The formula for the phosphoric acid monoester useful in the practice of the invention may be written as $(RO)PO(OH)_2$ while the phosphoric acid diester formula may be written as $(RO)(R'O)PO(OH)$. The formula for the phosphonic acid useful in the practice of the invention may be written as $RPO(OH)_2$ while the phosphinic acid may be written as $RR'PO(OH)$.

In each instance, R' may be hydrogen and both R and R', when in monomeric form, may each be comprised of 1-30, but more typically 6-30, carbon-containing molecules such as an alkyl group. It will, however, be appreciated that the number of carbon atoms in the carbon-containing group may be as high as 5000 when polymeric carbon-containing groups are used, as will be discussed below.

Other examples of groups which may comprise R and/or R' include long and short chain aliphatic hydrocarbons, aromatic hydrocarbons, carboxylic acids, aldehydes, ketones, amines, amides, thioamides, imides, lactams, anilines, pyridines, piperidines, anhydrides, carbohydrates and thiocyanates, esters, lactones, ethers, alkenes, alkynes, alcohols, nitriles, oximes, organosilicones, sulfur containing organic compounds, ureas, thioureas, perfluoro organic molecules, perchloro organic molecules, perbromo organic molecules and combinations of these groups. The phosphorus-containing organic molecules such as listed above may also include inorganic groups substituted thereon such as halogens, nitrates, phosphates, phosphinates, phosphinites, phosphonates, quaternary ammonium salts, and the like. While it is preferred that the free end of the organic group extends away from the surface of the metal compound particle, it is within the scope of the present invention to provide, on the free end of the molecule, functional groups. Functional groups may be defined as the group on the molecule which enables the reactive material (comprising the phosphorous-containing organic material bonded to the metal oxide/hydroxide surface) to react with, attract, couple to, bond with, etc. other atoms, ions and/or molecules. By attaching specific functional groups, either organic or inorganic, to the R and R' groups of the phosphoric esters or the phosphonic and phosphinic acids, a wide variety of adsorbent selectivities and capacities are provided. such functional groups may be already attached to the R and/or R' groups of the phosphorus-containing material prior to reaction with the metal oxide/hydroxide surface or the R and/or R' groups may be modified after the reaction with the metal oxide/hydroxide surfaces.

The functional groups attached to or contained within the free end can be selected from cation exchange functional groups and anion exchange functional groups such as $-SO_3H$, $-N^+(CH_3)_3Cl$, $-COONa$, $-NH_2$ and $-CN$, for example. The $-SO_3H$ functional group permits removal of cations such as $Cu+2$, $Fe+2$, $Co+2$, $Cd+2$, $Ca+2$, $Sr+2$, $Hg+2$, $Pb+2$, $Ba+2$ and $Be+2$ from aqueous media. The functional group, $-CH_2N(CH_3)_3Cl$, permits removal of anions such as $HSO_4-$, $ClO_3-$, $NO_3-$, $NO_2-$, $HPO_4-$, formate, and citrate. Other examples of functional groups that may terminate the free end of the phosphonated bonded hydrocarbon chain include the following: a carboxyl group, e.g., a carboxymethyl group, a glucose group, a monoclonal antibody, a cyano group, a phenyl group, a diphenyl group, a tertiary butyl group, a sulfonic group, a benzyl sulfonic group, protein groups such as protein A (staphytococcal protein A), enzyme groups, dye molecules, chelated metal groups, tag molecules and combination of these groups. Further, it should be noted that the carbon group can be a saturated or unsaturated carbon chain, cyclic group, polyaromatic group, or heterocyclic group.

The coated surface may also be further modified by materials which do not actually form a chemical bond with the phosphorus-containing organic acid bonded to the surface of the metal oxide/hydroxide. For example, a solution of a material such as 1-octadecyl sulfonic acid could be flowed over an active material already formed in accordance with the invention comprising a generally spherical particulate metal oxide/ hydroxide reacted with a phosphorus-containing organic acid. The non-polar end of the sulfonic acid molecule would intercalate with the hydrophobic phosphorus-containing organic acid layer on the spherical metal oxide/hydroxide particle, but would not form a chemical bond with the phosphorus-containing organic acid. This is a means for immobilizing specific functional groups on the hydrophobic surface without chemically bonding them to the surface.

It should be noted that the R or R' groups may be monomers or may be oligomers or polymers. Preferably, the oligomers have a molecular weight of less than 2000, while the polymers may have a much higher molecular weight, e.g., as high as 60,000 with as many as 5000 carbon atoms, i.e., a high polymer or macromolecule. By the use of monomer herein is meant to include a chemical compound that can undergo polymerization. By oligomer is meant a polymer or polymer intermediate containing relatively few structural units, i.e., a polymer containing 2-4 monomers. It must be further noted that the resultant material which is useful in forming the product of the invention is a polymer which has been reacted with a phosphorus-containing material, in contrast to a polymerized monomer with repeating phosphorus-containing groups.

While we do not wish to be bound by any particular theory of bonding, it is believed that when a metal oxide/hydroxide particle, for example, alumina, is brought into contact with the phosphorus-containing molecule, e.g., phosphoric acid mono or diester, phosphonic acid, or phosphinic acid, a reaction or adsorption of the phosphorus-containing group on the alumina takes place in which the aluminum and phosphorus atoms in the respective molecules are apparently bonded together through an oxygen atom as illustrated in the formulas below:

Phosphoric Acid Monoester + Hydrated Alumina ⟶

Product + Water

Phosphoric Acid Diester + Hydrated Alumina ⟶

Product + Water (with R—O—P=O / O / —Al—O—Al— / O / R'—O—P=O / O / R structure) + H₂O

Phosphonic Acid + Hydrated Alumina ⟶

Product + Water

Phosphinic Acid + Hydrated Alumina ⟶

Product + Water

Note: Aluminum ions may be an octrahedrally or tetrahedrally coordinated cation with or without coordination vacancies at or near the surface (external or within pore structures).

Thus it can be seen, using the above proposed models, that if all of the exposed hydroxyl groups on the surface of the metal oxide/hydroxide can be reacted with the phosphorus containing groups of the respective molecules, the surface chemistry of the reacted metal oxide/hydroxide will be changed.

Furthermore, the type of organic radical attached to the phosphorus-containing group or groups can be tailored to achieve certain types of affinities to provide selectivity in the adsorption characteristics of the product. For example, when an alumina treated with a phosphonic or phosphinic acid having a octadecyl R group is used, the following type of selectivity can be achieved. For example, theophylline, p-nitroaniline, methyl benzoate, phenetole, and o-xylene under chromatographic conditions can be selectively separated by adsorption on such a reactive material in accordance with the present invention, as shown in the chromatograms of FIGS. 9a–9e. This is because the retention time increases with decreasing effective polarity or charge.

Figure 7:
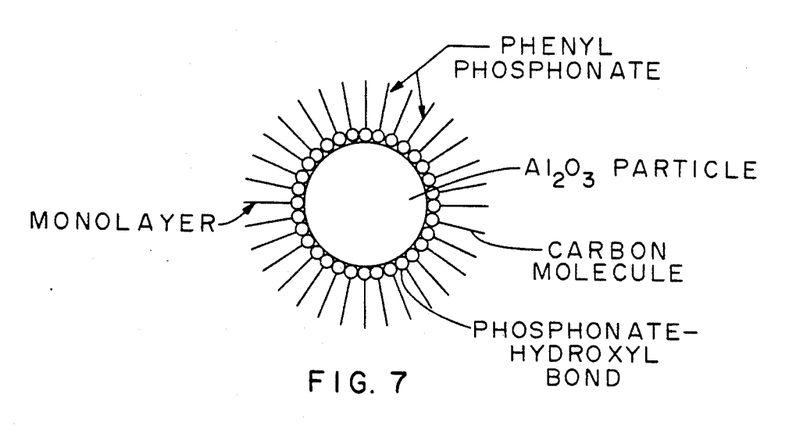
FIG. 7 is an illustration of the manner in which the phosphorus-containing group bonds to the metal oxide/hydroxide surface with the organic portion of the molecule facing away from the metal oxide/hydroxide surface.
Figure 8:
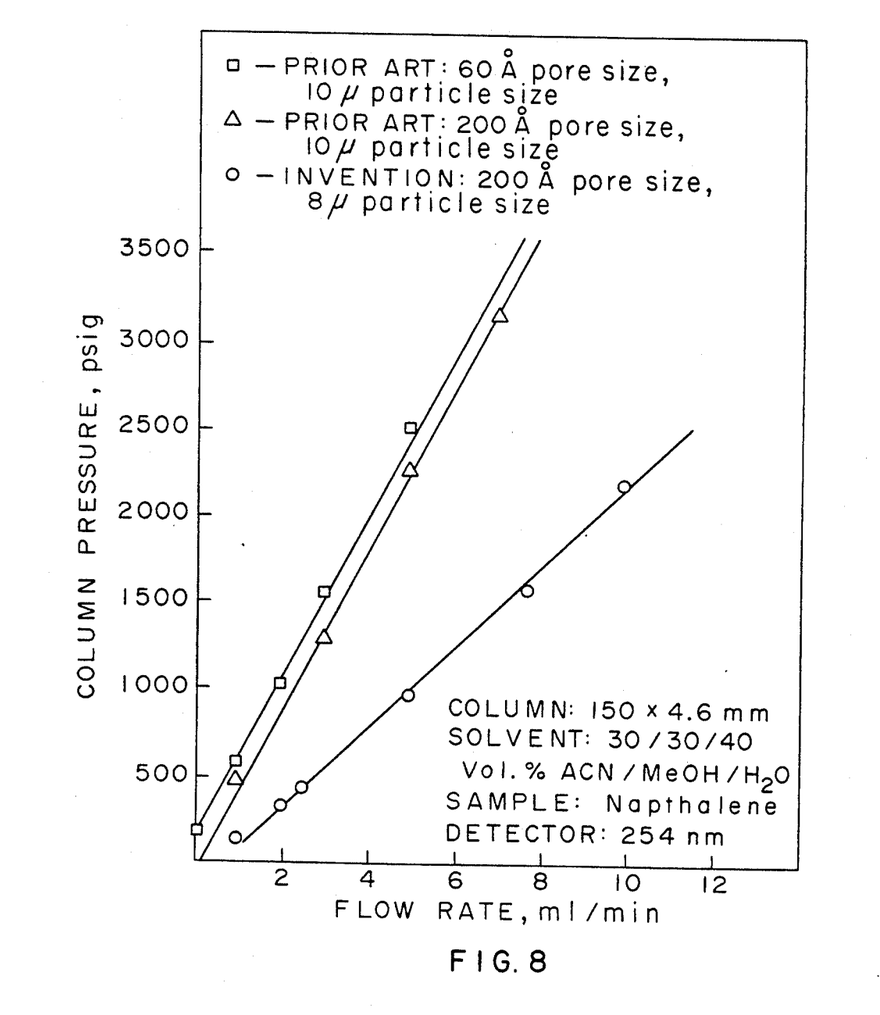
FIG. 8 is a graph showing a comparison of the backpressure for chromatographic columns respectively packed with the chromatographic material of the invention and prior art packing material.

The chemical bonding of the phosphorus-containing molecule, such as the phosphoric esters or the phosphonic or phosphinic acids, to the metal oxide/hydroxide particle, e.g. alumina particle, is illustrated in FIG. 7 wherein, for illustrative purposes only, the metal oxide/hydroxide surface is shown as completely spherical having a surface 50. The phosphorus-containing organic molecule is chemically bonded at one end to surface 50 by means of a phosphorus-oxygen-metal bond. As presently understood, it is preferred that the other or free end of the phosphorus-containing organic molecule extends away from the surface of the particle, as shown in FIG. 7. Further, it is important to control the application or bonding of the phosphorus-containing molecule to the metal oxide/hydroxide support when it is desired to obtain a monomolecular layer bonded to the metal oxide/hydroxide particle as illustrated in FIG. 7.

It should be noted that while the chemical bonding of the phosphorous-containing material to the metal oxide/hydroxide surface to form a monomolecular layer in one embodiment is preferred, physical adsorption of the phosphorus-containing material is also within the purview of the invention as well as, in certain circumstances, the formation of multiple layers of the phosphorus-containing material on the metal oxide/hydroxide particle surfaces.

By "monomolecular layer" is meant that 90%, and preferably 98%, of the phosphorus-containing organic molecules are bonded to the metal oxide/hydroxide particle surfaces as a single layer of molecules. Thus, the application should be controlled so as to prevent the R or R' groups from bonding to each other to form weakly adsorbed multilayers which would then provide further hydroxyl units, i.e., —POOH units directed away from and not bonded to the surface of the metal oxide/hydroxide particles, thereby defeating the purpose of the invention, for example, when it is used for an adsorbent. The thickness of the phosphorus-containing bonded organic monolayer is in the range of 3 to 5000 Angstroms and preferably 5 to 500 Angstroms.

The presence of a monomolecular layer may be determined using solids NMR (nuclear magnetic resonance) techniques using $31_p$ isotopes.

It should be further noted that the formation of the monomolecular layer of the phosphorus-containing organic molecules on the metal oxide/hydroxide surface should react with substantially all of the reactable hydroxyl groups on the surface of the metal oxide/hydroxide support to ensure that materials subsequently adsorbed on the surface are not bound to unreacted hydroxyl groups on the support material but rather are adsorbed onto the altered surface, i.e., adsorbed onto the organic end of the phosphorus-containing organic molecules bonded to the surface of the support material. By the term "substantially all" of the reactable hydroxyl groups on the metal oxide/hydroxide support is meant that at least 90%, preferably at least 99%, and most preferably over 99% of the hydroxyl groups are reacted with the phosphorus-containing organic molecules.

It is preferred that the monomer or oligomer used is at least a five or six-carbon chain. The chain can have 20 to 30 or more carbons, as noted earlier, when R or R' is a monomer, and as much as 5000 carbons when a polymer is used as R or R'. The longer chains preferably are used in the initial bonding or loading of the metal oxide particle with the phosphorus-containing carbon material. However, in some instances, because of the pores and fisures that can be present on the metal oxide/hydroxide particle, particularly those having high surface area, sometimes all the surface hydroxyl units are not reacted because of the inability of the longer chain phosphorus-containing organic material reaching or diffusing into the pores and fissures. Thus, if it is desired to inert or block such remaining reactive sites, short-chain monomers or oligomers, e.g., less than 6 carbon molecules per chain, may be used. In this way, when necessary, all of the reactive sites may be capped or blocked. That is, for capping off the reactive sites, short-chain monomers can be used.

Thus, for example, if desired, an alumina treated with a high molecular weight phosphonic or phosphinic acid, e.g. an n-heptadecylphosphonic acid, may be further treated with a low molecular weight phosphonic acid, e.g., methylphosphonic acid, to treat any remaining unreacted alumina surface areas.

The available surface area, both outside and inside of the pores, will be somewhat dependent upon the relationship between the pore size of the metal oxide/hydroxide support material and the length of the R group on the phosphorus-containing molecule. If the pore size is small with respect to the size of the R group on the phosphorus-containing molecule, the phosphorus-containing group may or may not be able to enter into the pores, thereby changing the effective area available for interaction with the organic material being passed through the chromatographic column.

The weight of the layer of phosphorus-containing material can range from about 0.01 to 75 wt. % calculated on the total weight of the coated metal oxide, and preferably the layer can range from about 0.5 to 20 wt. %, typically 1 to 20 wt. %. For purposes of ensuring that a monomolecular layer of phosphorus-containing organic material is bonded to the metal oxide particles, when such is desired, the application should be carefully controlled. That is, a monomolecular layer can be obtained, for example, by controlling the viscosity of the aqueous medium of solution, the time of exposure in the solution, the concentration of phosphorus-containing organic material in the solution, or the concentration of hydroxyl units on the metal oxide particles. As a precautionary measure, the coated particles may be treated in a solvent which will remove the physically adsorbed molecules.

It should be noted in this regard that when hydrophobic or oleophilic surfaces are desired, it is the long chain hydrocarbon R groups, not the short chain R' groups, which principally interact with the respective organic materials being passed though the column to provide the independent peaks identifying the particular organic material passing through the column at various rates of elution. The principal function of the shorter chain R' groups is to react with any remaining hydroxyl groups on the aluminum oxide/hydroxide support material so that the non-polar group or groups of the organic material passing through the column will interact with the non-polar packing material--rather than the polarized end of the organic molecule passing through the column interacting with exposed hydroxyl groups on the support material—so that a true reversed phase profile through the chromatographic column is maintained. Thus, the shorter chain phosphorus-containing organic molecule must be reacted with the support surface in an amount sufficient to bond to substantially all reactive hydroxyl sites remaining on the support surface after the initial treatment with the one or more longer chain phosphorus-containing molecules.

After formation of the packing material, the material may be treated in either a basic or acidic solution, or both, to remove any weakly adsorbed molecules on the particles. This ensures that all of the molecules remaining are bonded to the hydroxyl groups on the metal oxide/hydroxide surface and not to one another, thus assuring formation of the desired monomolecular layer stable over a wide range of pH.

In a preferred embodiment, a sodium hydroxide solution, having a concentration ranging from about 0.001 to 1 molar and buffered with sufficient sodium bicarbonate to maintain the pH in a range of from about 9–12, may be used as the wash solution to remove the excess organic acid molecules, leaving only the desired bonded monomolecular layer. Other wash solutions which may be used instead of the sodium hydroxide include potassium hydroxide and ammonium hydroxide solutions which may also be buffered to provide approximately the same pH range.

For example, the wash solution may also comprise a weak acid such as a carboxylic acid, e.g., acetic or formic acid or a weak mineral acid (0.1–2N) such as sulfuric, nitric, or hydrochloric acid. The wash solution might also comprise an alcohol such as isopropanol or butanol. However, the use of bases as wash solutions are preferred since the resulting salts, e.g., sodium or potassium salts, are more soluble.

The resulting chromatographic packing material is stable at pH ranges of from 1–14 and has good stability in the range of 1–12 while still maintaining high efficiency of separation with N numbers of 18,000 to as high as over 35,000, where N equals the theoretical plates which equals 5.53 times (retention time of peak/width of peak at half of its height)$^2$.

The following examples will serve to better illustrate the invention.

EXAMPLE 1

To prepare the aluminum hydroxide crystals described and claimed in the aforementioned Wilhelmy patent application, an aluminate solution was prepared using reagent grade sodium hydroxide pellets, 99.96% pure aluminum powder (Alcoa 7123 atomized powder) and freshly boiled distilled water. About 260 grams/liter of sodium hydroxide pellets were added to a Teflon bottle twice the volume of the final solution. To this was slowly added water with stirring until the solution was approximately one-half the final volume (½ liters). The bottle was then immersed in cold water. 123 grams of the aluminum powder was then slowly added to the solution as a slurry. After the addition was completed, the suspension was placed in an oil bath and heated to boiling. The contents were boiled until the solution was clear. This resulting solution was cooled to room temperature and diluted to a volume of 1 liter. The solution was allowed to stand overnight and filtered the following day using a 0.45 micrometer Metricel DM membrane (Gelman Instrument Co.).

The resulting solution having a [$Al^{3+}$]:[NaOH] ratio of 0.7 was divided into two portions. One portion was diluted with an NaOH solution to form a final solution having a [$Al^{3+}$]:[NaOH] ratio of 0.6. The two solutions were aged at 75° C. for 3 and 9 hours, respectively. Aluminum hydroxide was then precipitated from each of the samples and the diameter to length ratio was determined as shown in the following table:

TABLE I

| Sample Number | Molarity of NaOH | $Al^{3+}$:NaOH Ratio | Diameter/Length of Crystals |
|---|---|---|---|
| 1 | 0.75 | 0.6 | 0.3 |
| 2 | 1.50 | 0.6 | 0.5 |
| 3 | 3.00 | 0.6 | 2.0 |
| 4 | 4.50 | 0.6 | 1.6 |
| 5 | 6.00 | 0.6 | 11.0 |
| 6 | 0.75 | 0.7 | 0.3 |
| 7 | 1.50 | 0.7 | 0.7 |
| 8 | 3.00 | 0.7 | 1.2 |
| 9 | 4.50 | 0.7 | 1.9 |

The results indicate that for both 0.6 and 0.7 ratios, the crystals increase in their diameteR'length ratios as the concentration of the sodium hydroxide increases, i.e., the crystals become more lamellar.

EXAMPLE 2

To further demonstrate the invention, lamellar alumina particles, made in accordance with the procedures of Example 1, and having a median particle size of 12.5 microns were calcined by heating to 300° C. at 5° C. per minute and then held at that temperature for 2 hours to allow slow dehydroxylation of the aluminum hydroxide. The alumina was then heated to 500° C. to decompose any remaining aluminum hydroxide. The calcined alumina was then slurried in deionized water and treated with nitric acid until the pH reached about 6.5. This calcination and neutralization procedure was repeated until a pH below 7 was obtained indicating sufficient sodium removal from the particles.

80 grams of the particles were then treated with varying amounts of octadecyl phosphonic acid, (C18) as listed in Table II, until the surface concentration of the octadecyl phosphonic acid on the alumina surface reached between 4.39 to 4.94 micromoles/square meter. The reaction was carried out at about the boiling point of the n-butanol solvent, i.e., about 110°-120° C. for 60 minutes while stirring the mixture at 200 rpm.

Some of the treated alumina was then capped by treating with methyl phosphonic acid until a concentration of about 1.40 micromoles of methyl phosphonic acid per m$^2$ of alumina was bonded to the alumina, i.e., the remaining alumina surfaces not reacted with the octadecyl phosphonic acid were reacted with a lower molecular weight phosphonic acid. Other material was capped by treating with phenyl phosphonic acid until a concentration of about 0.87 to about 0.93 micromoles/m$^2$ alumina was reached. Some of the octadecyl phosphonic acid treated alumina was not further reacted or "capped".

The treated alumina, in each case, was slurried in 2-propanol (1 ml/gm of alumina) and a sodium bicarbonate/sodium hydroxide pH 10 buffer was added. Each sample was then shaken for 4 hours, allowed to settle, and the supernatant was decanted. This procedure was then repeated using a 5 ml/gm ratio of 2-propanol/alumina. Finally, the product was slurried in methol at 5 ml/gm, decanted and allowed to vacuum dry overnight at 60° C. followed by 1 hour under vacuum at 125° C.

TABLE II

Octadecyl Phosphonic Acid Supplied and Bound to Alumina

| Sample No. | Alumina Surface Area m$^2$/g | Fed Micromoles of C-18/m$^2$ Al$_2$O$_3$ | Reacted Micromoles of C-18/m$^2$ Al$_2$O$_3$ |
|---|---|---|---|
| 1 | 88.2 | 6.33 | 4.53 |
| 2 | 86.4 | 5.75 | 4.39 |
| 3 | 88.2 | 6.33 | 4.73 |
| 4 | 86.4 | 5.75 | 4.57 |
| 5 | 88.2 | 7.45 | 4.53 |
| 6 | 86.4 | 6.49 | 4.57 |
| 7 | 88.2 | 7.45 | 4.94 |
| 8 | 86.4 | 6.49 | 4.61 |

Chromatographic columns of 0.46 cm I.D. and 25 cm length were then packed respectively with about 4 grams of alumina reacted only with octadecyl phosphonic acid (uncapped), reacted with octadecyl phosphonic acid and then capped with methyl phosphonic acid, or reacted with octadecyl phosphonic acid and then caploed with phenyl phosphonic acid.

Test solutions were then prepared containing 90 mg of theophylline, 90 mg of p-nitroaniline, 200 microliters of methyl benzoate, 600 microliters of phenetole, and 1800 microliters of o-xylene dissolved in a solvent mixture of 30 vol. % acetonitrile, 30 vol. % methanol and 40 vol. % water (prior to mixing) to demonstrate the efficiency of the separations at various pH levels.

These test solutions was then injected into each packed column in 10 microliter aliquots at a flow rate of 1.0 ml/minute at room temperature. Five peaks were detected by a variable wavelength spectrometer corresponding to the five components of the test solution. The elution order of the components of the test solution in each case was theophylline, p-nitroaniline, methyl benzoate, phenetole, and o-xylene. For purposes of this invention it is only important to note the elution times of the fifth peak in each case.

The results are shown in Table V below. The variation in fifth peak elution times for capped and uncapped octadecyl phosphonic acid groups is shown in Table VI. Higher surface concentration of organic groups on the packing in a liquid chromatography column increases the elution time of non-polar components in mixtures being separated. Fifth peak elution times for uncapped treated alumina are compared to the elution times for treated alumina and also capped with methyl phosphonic acid. The columns with the longest elution times are those packed with methyl phosphonic acid capped packings.

TABLE V

| Column No. | Capping Reagent | Fifth Peak Elution Time/min. | Comments |
| --- | --- | --- | --- |
| 500 | Methyl | 11.16 | Theoretical plates calculated |
| 501 | Methyl | 11.20 | by integrator |
| 502 | Methyl | 11.45 | Theoretical plates calculated |
| 503 | Methyl | 11.39 | by integrator |
| 537 | — | 10.37 | Stable |
| 568 | — | 9.15 | Stable, CHC1PV3PV in pack liquid |
| 523 | Phenyl | 11.06 | Unstable base line |
| 553 | — | 10.47 | Stable base line |
| 515 | Phenyl | 11.21 | Unstable base line |
| 557 | — | 10.02 | Stable base line |
| 512 | Methyl | 10.22 | Leading edge asymmetry |
| 513 | Methyl | 10.02 | Leading edge asymmetry |
| 540 | — | 8.82 | Good symmetry |
| 541 | — | 10.54 | Good symmetry |
| 542 | — | 9.24 | Good symmetry |
| 543 | — | 10.08 | Leading edge symmetry |
| 544 | — | 9.78 | |
| 550 | — | 9.64 | |
| 516 | Phenyl | 11.57 | Unstable base line |
| 555 | — | 10.75 | Stable base line |
| 508 | Methyl | 10.34 | Some Peak asymetry, leading edge |
| 538 | — | 9.75 | Good peak shape |
| 566 | — | 8.94 | Good peak shape, but wide |
| 567 | Methyl | 9.64 | Chloroform solvent packing |
| 509 | Methyl | 9.88 | Leading edge asymmetry |
| 511 | Methyl | 10.64 | Leading edge asymmetry |
| 539 | — | 9.11 | Leading edge asymmetry |
| 504 | Phenyl | 11.04 | Unstable base line |
| 505 | Phenyl | 11.27 | Unstable base line |
| 506 | — | 9.32 | Stable base line |
| 507 | — | 8.81 | Stable base line |
| | | 8.94 | Stable base line |
| 523 | Phenyl | 11.055 | Bled bonded phase |
| 514 | Phenyl | 11.54 | Bleeding, unstable base line |
| 565 | — | 10.22 | Stable base line |

TABLE VI

| With Methyl Phosphonic Acid Cap | | Without Methyl Phosphonic Acid Cap | |
| --- | --- | --- | --- |
| Column No. | Fifth Peak Retention Time/min. | Column No. | Fifth Peak Retention Time/min. |
| 500 | 11.16 | 537 | 10.37 |
| 501 | 11.20 | 568 | 9.15 |
| 502 | 11.45 | | |
| 503 | 11.39 | | |
| 512 | 10.22 | 540 | 8.82 |
| 513 | 10.02 | 541 | 10.54 |
| | | 542 | 9.24 |
| | | 543 | 10.08 |
| | | 544 | 9.78 |
| | | 550 | 9.64 |
| 508 | 10.43 | 538 | 9.75 |
| 567 | 9.64 | 566 | 8.94 |
| 509 | 9.88 | 539 | 9.11 |
| 511 | 10.64 | | |

EXAMPLE 3

Figure 9A:
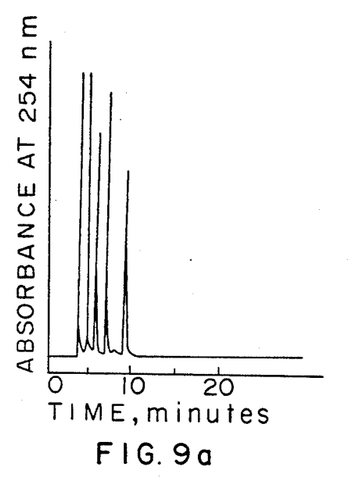
FIGS. 9a-9e are chromatograms showing the separations of theophylline, p-nitroaniline, methyl benzoate, phenetole, and o-xylene eluted with solvents ranging in pH from 1 to 11 using the chromatographic material of the invention.
Figure 9B:
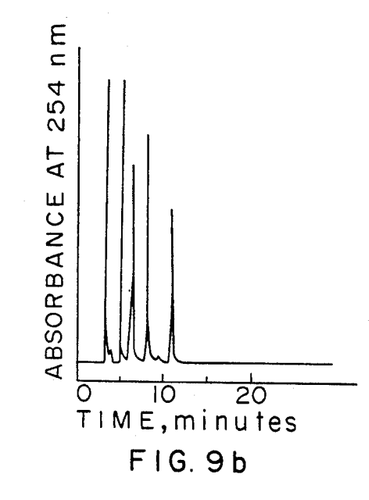
Figure 9C:
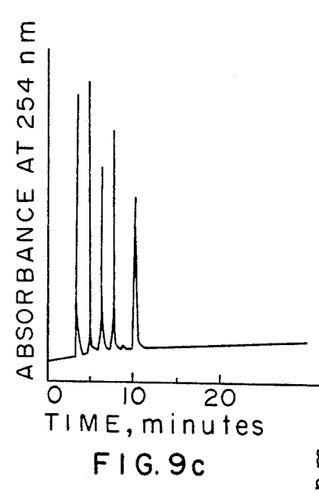
Figure 9D:
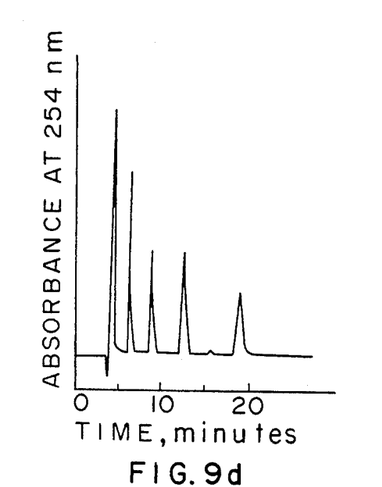
Figure 9E:
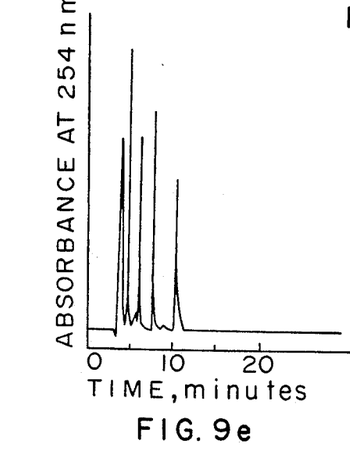

Uisng the same columns as in Example 2, the same solution was run through the columns, but at various pHs to show the stability of the absorbent material fo the invention over a wide pH range. The results are shown in the chromatograms of FIG. 9a–9e. In FIG. 9a, the mobile phase was a 50 wt. % acetonitrile/ 50 wt. % water mixture having a pH, measured before addition of the organic phase, of 7. In FIG. 9b, the mobile phase was a 50 wt. % acetonitrile/ 50 wt. % water mixture with 0.05 wt. % Tris (2-amino-2-hydroxy methyl-1,3-propane diol) added to raise the pH to 9. In FIG. 9c, the mobile phase was a 50 wt. % acetonitrile/ 50 wt. % water mixture with sufficient sodium bicarbonate/-sodium hydroxide added to raise the pH to 10. In FIG. 9d, the mobile phase was a 50 wt. % acetonitrile/ 50 wt. % water mixture with sufficient 0.1 M sulfuric acid added to lower the pH to 1. In FIG. 9e, the mobile phase was a 50 wt. % acetonitrile/ 50 wt. % water mixture with sufficient trifluoroacetic acid added to lower the pH to 2. The elution rate was about 0.7 ml/minute with absorbents monitored at 254 nanometers measured using a variable wavelength (uv/vis) spectrometer with 2.56 absorbence units at full scale sensitivity.

EXAMPLE 4

Figure 10A:
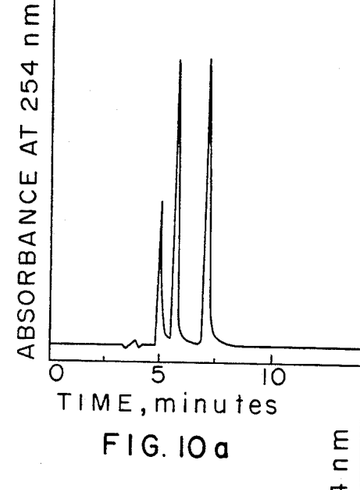
FIGS. 10a-10c are chromatograms showing the separation of an amine mixture of aniline, N-methyl aniline, and N,N-dimethyl aniline eluted with solvents ranging in pH from 7 to 11 using the chromatographic material of the invention.
Figure 10B:
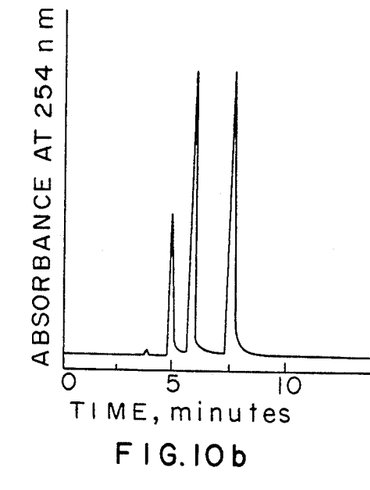
Figure 10C:
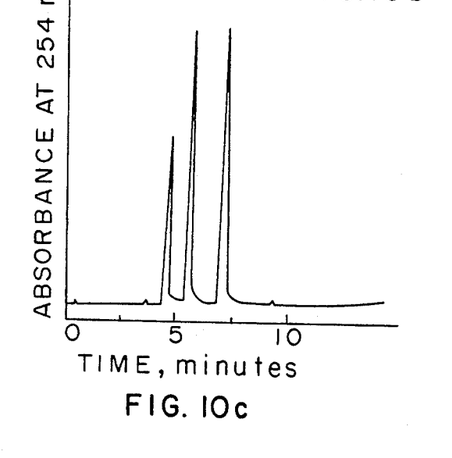

Using the same type of separation columns as in Example 2 above, amine mixtures of aniline, N-methyl aniline, and N,N-dimethyl aniline were eluted with solvents ranging in pH from 7-11. The results are shown in the chromatograms of FIGS. 10a–10c. The mobile phase in FIG. 10a was a 50 wt. % acetonitrile/ 50 wt. % water mixture having a pH of 7. The mobile phase in FIG. 10b was a 50 wt. % acetonitrile/ 50 wt. % water mixture with sufficient 0.05M Tris added to raise the pH to 9. The mobile phase in FIG. 10c was a 50 wt. % acetonitrile/ 50 wt. % water mixture with sufficient sodium bicarbonate/sodium hydroxide added to raise the pH to 10. The elution rate was again about 0.7 ml/minute with the 254 nanometer wavelength measured using a variable wavelength (uv/vis) spectrometer with 2.56 absorbent units at full scale sensitivity.

The peaks show surprisingly good symmetry and are not skewed. Amine compounds separated on reverse phase silica-packed columns usually show assymetric peaks.

EXAMPLE 5

Figure 11:
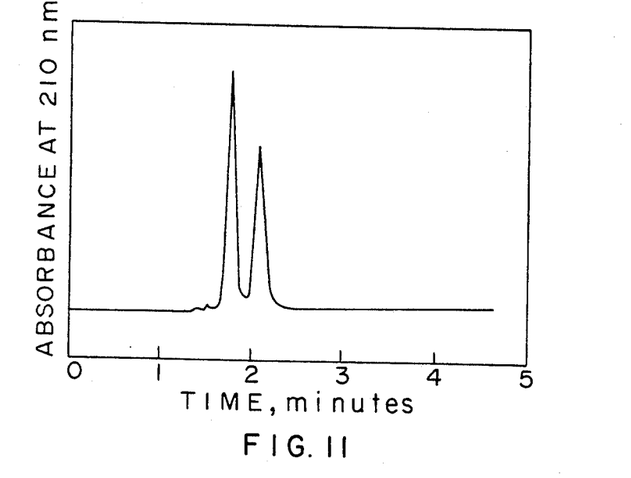
FIG. 11 is a chromatogram showing the separation of a peptide mixture of methionine enkephalin and leucine enkephalin using the chromatographic material of the invention.

To demonstrate the separation of 5 amino acid peptides using the material of the invention, a solution was made up comprising 5.5 ppm methionine enkephalin and 5.1 ppm leucine enkephalin dissolved in a solvent comprising 25% acetonitrile, 75% water and 0.1% trifluoroacetic acid and having a pH of 1.5. the flow rate in this case was 2 ml/minute with the detector wavelength set at 210 nanometers. The results are shown in FIG. 11 which indicates both the baseline separation and excellent peak symmetry possible using the material of the invention.

Thus the invention provides an improved chromatographic packing material with an extended area which exhibits good stability over a wide pH range with good separation efficiency.

Having thus described the invention, what is claimed is:

1. An improved chromatographic packing material comprising generally spherical metal oxide/hydroxide particles having chemically bonded to reactive sites on a surface thereof, a monomolecular layer of a phosphorous containing material selected from phosphoric acid monoester, phosphoric acid diester, phosphonic acid, phosphinic acid and mixtures thereof, the
   (a) phosphoric acid monoester having the formula $(RO)PO(OH)_2$;
   (b) the phosphoric acid diester having the formula $(RO)(R'O)PO(OH)$;
   (c) the phosphonic acid having the formula $RPO(OH)_2$; and
   (d) the phosphinic acid having the formula $RR'PO(OH)$ where R comprises a 1-30 carbon containing group, R' comprises hydrogen or a 1-30 carbon containing group, the generally spherical particles comprises of crystals extending radially outward from a central core region and having a shape selected from principally acicular to principally lamellar.

2. The improved chromatographic packing material of claim 1 wherein said metal oxide/hydroxide support particles have a particle density ranging from about 0.3 to 3.96 grams/cc.

3. The improved chromatographic packing material of claim 1 wherein said generally spherical metal oxide/hydroxide support particles comprises an oxide/hydroxide of an element capable of forming said generally spherical oxide/hydroxide particles comprising crystals of metal oxide/hydroxide with the crystals extending radially outward from a central core region and having a shape selected from principally acicular to principally lamellar selected from the class of metal oxide/hydroxides capable of forming a physical or chemical bond to said phosphorus-containing material consisting of Groups IIIa, IVa, Va, VIa, VIIa, VIII, Ib, IIb, IIIb, IVb, Vb, elements in the lanthanide series and the actinide series, mixtures thereof, and mixtures of Grops IIa and VIb.

4. The improved chromatographic packing material of claim 3 wherein said metal oxide/hydroxide support particles comprises an oxide/hydroxide of a metal selected from the class consisting of aluminum, magnesium, titanium, zirconium, iron, chromium, zinc, vanadium, and combinations of these metals.

5. The improved chromatographic packing material of claim 4 wherein said metal oxide/hydroxide support particles comprises aluminum oxide/hydroxide.

6. The improved chromatographic packing material of claim 4 wherein said metal oxide/hydroxide support particles comprises zirconium oxide/hydroxide.

7. The improved chromatographic packing material of claim 1 wherein said phosphoric acid monoester has the formula $(RO)PO(OH)_2$ where R comprises a 1-5 carbon group.

8. The improved chromatographic packing material of claim 1 wherein said phosphoric acid diester has the formula $(RO)(R'O)PO(OH)$ where R comprises a 1-5 carbon group and R' comprises a 1-5 carbon group.

9. An improved chromatographic packing material comprising generally spherical aluminum oxide/hydroxide particles having chemically bonded to reactive sites on a surface thereof, a monomolecular layer of a phosphorous containing material selected from phosphonic acid monoester, phosphoric acid diester, phosphoric acid, phosphinic acid and mixtures thereof, the
   (a) phosphoric acid monoester having the formula $(RO)PO(OH)_2$;
   (b) the phosphoric acid diester having the formula $(RO)(R'O)PO(OH)$;
   (c) the phosphonic acid having the formula $RPO(OH)_2$; and
   (d) the phosphinic acid having the formula $RR'PO(OH)$ where R comprises a 1-30 carbon containing group, R' comprises hydrogen or a 1-30 carbon containing group, the generally spherical aprticles comprised of crystals extending radially outward from a central core region and having a shape selected from principally acicular to principally lamellar.

10. The improved chromatographic packing material of claim 9 wherein either said R group or said R' group may comprise an organic radical selected from the class consisting of long and short chain aliphatic hydrocarbons, aromatic hydrocarbons, carboxylic acids, aldehydes, ketones, amines, amides, thioamides, imides, lactams, anilines, pyridines, piperidines, anhydrides, carbohydrates, esters, lactones, ethers, alkenes, alkynes, alcohols, nitriles, oximes, ureas, thioureas, perfluoro organic molecules, perchloro organic molecules, perbromo organic molecules and combinations of these groups.

11. The improved chromatgraphic packing material of claim 9 wherein said R group or said R' group may comprise an oligomer having a molecular weight of less than 2000.

12. The improved chromatographic packing material of claim 9 wherein either said R group or said R' group may comprise a monomer containing from 1-30 carbon atoms.

13. The improved chromatographic packing material of claim 9 wherein either said R gorup or said R' group may have a functional group attached to a portion of said molecule separated from said phosphorous-containing group on said molecule by one or more carbon atoms and selected from the class consisting of a carboxyl group, a glucose group, a cyano group, a cyanate group, an isocyanate group, a thiocyanate group, a phenyl group, a diphenyl group, a tertiary butyl group, a sulfonic group, a benzyl sulfonic group, a halogen group, a nitrate group, a phosphate group, a phosphinate group, a phosphinite group, a phosphonate group, a quaternary ammonium salt group, and combinations of these groups.

14. The chromatographic packing material of claim 9 wherein said layer of said one or more phosphonic acid bonded to said support particles comprise a mixture of:
   (a) from about 25 to about 95% of one or more phosphonic acids having the formula $PRO(OH)_2$ wherein R is a 5-30 carbon saturated or unsaturated aliphatic hydrocarbon or an aromatic hydrocarbon; and
   (b) from about 5 to about 75% of one or more phosphonic acids having the formula $R'PO(OH)_2$ wherein R' is a 1-4 carbon saturated or unsaturated aliphatic hydrocarbon.

15. The chromatographic packing material of claim 9 wherein said phosphonic acid having the formula $R'PO(OH)_2$ consists essentially of methyl phosphonic acid which is reacted with reactive sites on said metal oxide/hydroxide support material after reaction between said support material and said one or more phosphonic acids having 5-30 carbons thereon in an amount sufficent to react with any remaining reactive hydroxyl sites on said support material.

* * * * *

UNITED STATES PATENT AND TRADEMARK OFFICE
CERTIFICATE OF CORRECTION

PATENT NO. : 5,037,795
DATED : August 6, 1991
INVENTOR(S) : Wieserman et al

It is certified that error appears in the above-identified patent and that said Letters Patent is hereby corrected as shown below:

On the title page, Item [54] and in Column 1:
Delete the title and substitute therefor --Chromatographic Packing Material--.

Col. 14, line 51    Change "caploed" to --capped--.

Col. 17, line 40    Change "Grops" to --Groups--.
Claim 3

Col. 18, line 27    After "wherein", insert --either--.
Claim 11

Col. 18, line 52    Change "PRO(OH)$_2$" to --RPO(OH)$_2$--.
Claim 14

Signed and Sealed this

Twenty-ninth Day of June, 1993

Attest:

MICHAEL K. KIRK

*Attesting Officer*    *Acting Commissioner of Patents and Trademarks*